(12) United States Patent
Murakami et al.

(10) Patent No.: US 9,195,250 B2
(45) Date of Patent: Nov. 24, 2015

(54) SWITCHING POWER SUPPLY DEVICE

(71) Applicant: Rohm Co., Ltd., Kyoto (JP)

(72) Inventors: Kazuhiro Murakami, Kyoto (JP); Shinji Kawata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 253 days.

(21) Appl. No.: 13/899,776

(22) Filed: May 22, 2013

(65) Prior Publication Data

US 2013/0314606 A1    Nov. 28, 2013

(30) Foreign Application Priority Data

May 23, 2012  (JP) ................................. 2012-117435

(51) Int. Cl.
| | |
|---|---|
| *H02M 3/156* | (2006.01) |
| *G05F 1/618* | (2006.01) |
| *H04N 5/63* | (2006.01) |
| *H02M 3/157* | (2006.01) |

(52) U.S. Cl.
CPC . *G05F 1/618* (2013.01); *H04N 5/63* (2013.01)

(58) Field of Classification Search
CPC ............. H02M 2001/0045; H02M 2001/0032; H02M 2001/0012; H02M 2001/0009; H02M 2001/0025; H02M 3/07; H02M 3/1584; H02M 3/156; H02M 3/1582; H02M 3/158; H02M 3/1588; H02M 3/157; H02M 3/33507
USPC ................. 323/265, 268, 271, 282–285, 288
See application file for complete search history.

(56) References Cited

U.S. PATENT DOCUMENTS

| | | | |
|---|---|---|---|
| 7,714,547 B2 | 5/2010 | Fogg et al. | |
| 8,198,881 B2* | 6/2012 | Tsukamoto | 323/288 |
| 2004/0251887 A1* | 12/2004 | Sparrell et al. | 323/312 |
| 2008/0024104 A1 | 1/2008 | Yamada | |
| 2008/0224674 A1* | 9/2008 | Hasegawa | 323/271 |

FOREIGN PATENT DOCUMENTS

| | | |
|---|---|---|
| JP | 2008-029159 | 2/2008 |
| JP | 2009-148155 | 7/2009 |
| JP | 2009-148157 | 7/2009 |
| JP | 2010-226930 | 10/2010 |

* cited by examiner

*Primary Examiner* — Gary L Laxton
*Assistant Examiner* — Kevin H Sprenger
(74) *Attorney, Agent, or Firm* — Fish & Richardson P.C.

(57) ABSTRACT

A switching power supply device includes: a non-linear control type switching control unit that, in accordance with a result of a comparison between a feedback voltage and a reference voltage, performs on/off control of a switch element, and thereby generates an output voltage from an input voltage; a backflow current detection unit that, upon detecting a backflow current flowing to the switch element, forcibly switches off the switch element; and an on-time setting unit that sets an on-time of the switch element, in a case of the backflow current not being detected, in accordance with a duty of the switch element, and in a case of the backflow current being detected, in accordance with a switch voltage appearing at one end of the switch element or the output voltage.

6 Claims, 18 Drawing Sheets

SWITCHING POWER SUPPLY DEVICE

CROSS-REFERENCE TO RELATED APPLICATIONS

This application is based on and claims the benefit of priority from the following Japanese Patent Application, the contents of which are hereby incorporated by reference.

(1) Japanese Patent Application No. 2012-117435 (filing date: May 23, 2012)

BACKGROUND OF THE INVENTION

1. Field of the Invention

The present invention relates to a non-linear control type switching power supply device and an electronic apparatus (for example, a television set) using the same.

2. Description of Related Art

FIG. 18 shows a circuit block diagram and an operational waveform diagram illustrating a conventional example of a switching power supply device adopting non-linear control (herein, fixed on-time with bottom detection control). A switching power supply device shown in FIG. 18 is a synchronous rectification type voltage step-down DC/DC converter that generates an output voltage OUT of a desired level by stepping down an input voltage IN.

Examples of prior art related to the above include techniques described in JP-A-2008-29159, JP-A-2009-148155, JP-A-2009-148157, the publication of U.S. Pat. No. 7,714,547, and JP-A-2010-226930, respectively.

A non-linear control type switching power supply device is characterized in that, compared with a switching power supply device using linear control (such as, for example, voltage mode control or current mode control), a high load response characteristic can be obtained by using a simple circuit configuration.

In the non-linear control type switching power supply device, however, a switching frequency of an output transistor varies largely with an input voltage IN, an output voltage OUT, and an output current IOUT. Because of this, the non-linear control type switching power supply device has been problematic in that, compared with the linear control type switching power supply device, it is poor in output voltage accuracy and in load regulation characteristic (stability of the output voltage OUT with respect to a variation in load).

Furthermore, in a case where an attempt is made to use the non-linear control type switching power supply device as a power supply for an application involving a large input voltage variation or for an application requiring various output voltages, in order to allow power in a wide frequency band to be handled, measures should be taken to prevent EMI (electromagnetic interference) and noise, which has made set designing difficult.

SUMMARY OF THE INVENTION

In view of the above-described problems found by the inventors of the present application, the present invention has as its object to provide a switching power supply device that is capable of suppressing a variation in switching frequency without impairing advantages of non-linear control.

In order to achieve the above-described object, a switching power supply device according to the present invention has a configuration including: a non-linear control type switching control unit that, in accordance with a result of a comparison between a feedback voltage and a reference voltage, performs on/off control of a switch element, and thereby generates an output voltage from an input voltage; a backflow current detection unit that, upon detecting a backflow current flowing to the switch element, forcibly switches off the switch element; and an on-time setting unit that sets an on-time of the switch element, in a case of the backflow current not being detected, in accordance with a duty of the switch element, and in a case of the backflow current being detected, in accordance with a switch voltage appearing at one end of the switch element or the output voltage.

Other features, constituent components, operational steps, advantages, and characteristics of the present invention will further be clarified by the following detailed descriptions of best modes and appended drawings related thereto.

DETAILED DESCRIPTION OF PREFERRED EMBODIMENTS

First Embodiment

[Overall Configuration]

Figure 1:
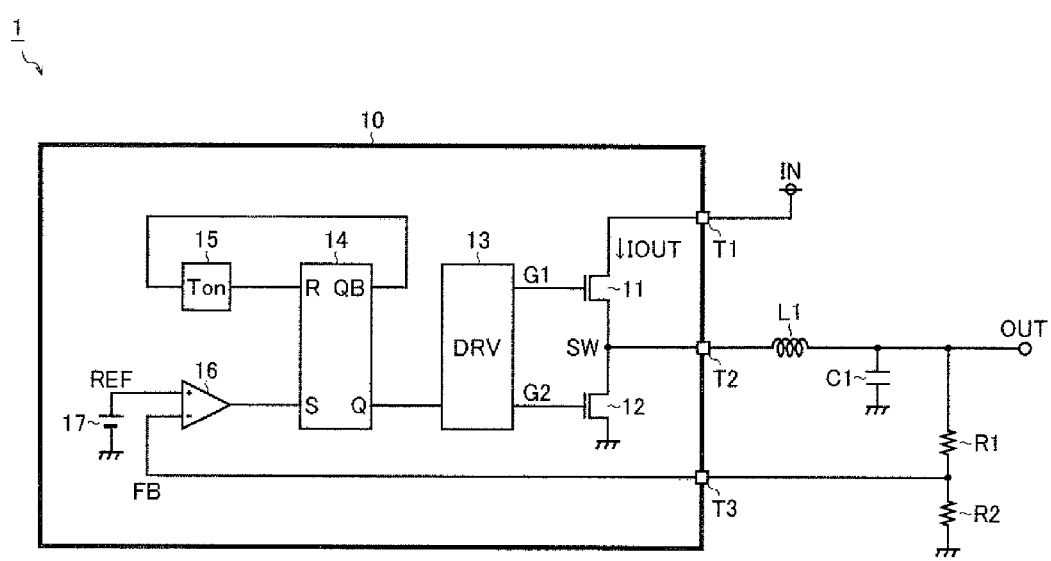
FIG. 1 is a block diagram showing a first embodiment of a switching power supply device.

FIG. 1 is a block diagram showing a first embodiment of a switching power supply device. A switching power supply device 1 of the first embodiment is a voltage step-down DC/DC converter that generates an output voltage OUT from an input voltage IN by non-linear control (herein, fixed on-time with bottom detection control). The switching power supply device 1 has a semiconductor device 10 and various discrete components (an inductor L1, a capacitor C1, resistors R1 and R2) externally connected to the semiconductor device 10.

The semiconductor device 10 has at least external terminals T1 to T3 to establish an electrical connection with the outside. Outside the semiconductor device 10, the external terminal (power terminal) T1 is connected to an input end of the input voltage IN. The external terminal (switch terminal) T2 is connected to a first end of the inductor L1. A second end of the inductor L1, a first end of the capacitor C1, and a first end of the resistor R1 are all connected to an input end of the output voltage OUT. A second end of the capacitor C1 is connected to a ground terminal. A second end of the resistor R1 and a first end of the resistor R2 are both connected to the external terminal (feedback terminal) T3 of the semiconductor device 1. A second end of the resistor R2 is connected to the ground terminal. The resistors R1 and R2 function as a feedback voltage generation unit that outputs, from a connection node between the resistors R1 and R2, a feedback voltage FB obtained by dividing the output voltage OUT.

The semiconductor device 10 is a so-called switching power supply IC in which N-channel type MOS field-effect transistors 11 and 12, a driver 13, an SR flip-flop 14, an on-time setting unit 15, a comparator 16, and a reference voltage generation unit 17 are integrated.

The transistor 11 is an output transistor that is connected between the external terminal T1 and the external terminal T2 and whose on/off control is performed in accordance with a gate signal G1 inputted from the driver 13. To be specific in terms of connection relationships, a drain of the transistor 11 is connected to the external terminal T1, a source of the transistor 11 is connected to the external terminal T2, and a gate of the transistor 11 is connected to an input end of the gate signal G1.

The transistor 12 is a synchronous rectification transistor that is connected between the external terminal T2 and the ground terminal and whose on/off control is performed in accordance with a gate signal G2 inputted from the driver 13. To be specific in terms of connection relationships, a drain of the transistor 12 is connected to the external terminal T2, a source of the transistor 12 is connected to the ground terminal, and a gate of the transistor 12 is connected to an input end of the gate single G2. Alternatively, as a rectification element, a diode may be used in place of the transistor 12.

In accordance with an output signal Q of the SR flip-flop 14, the driver 13 generates the gate signals G1 and G2, and it performs control of complementary (exclusive) switching between the transistors 11 and 12. The term "complementary (exclusive)" used in this specification is intended to refer not only to a case where on/off states of the transistors 11 and 12 are completely contrary to each other but also to a case where a predetermined delay is given to on/off transition timing of the transistors 11 and 12 from a standpoint of prevention of a flow-through current (a case where a simultaneous off-period is provided).

The SR flip-flop 14 sets the output signal Q to a high level at a rising edge of a set signal S inputted from the comparator 16 and resets the output signal Q to a low level at a rising edge of a reset signal R inputted from the on-time setting unit 15.

After a predetermined on-time Ton has elapsed since a fall of an inverted output signal QB of the SR flip-flop 14 to a low level, the on-time setting unit 15 generates a trigger pulse of a high level for the reset signal R. The configuration and operation of the on-time setting unit 15 will be described in detail later.

The comparator 16 compares a feedback voltage FB (a division voltage obtained by dividing the output voltage OUT) inputted from the external terminal T3 (the connection node between the resistor R1 and the resistor R2) to an inverted input terminal (−) thereof with a reference voltage REF inputted from the reference voltage generation unit 17 to a non-inverted input terminal (+) thereof, and based on a result of the comparison, outputs the set signal S. If the feedback voltage FB is higher than the reference voltage REF, a resulting level of the set signal S is low, and if the feedback voltage FB is lower than the reference voltage REF, a resulting level of the set signal S is high.

By using a band gap circuit or the like, the reference voltage generation unit 17 generates the reference voltage REF that is constant irrespective of variations in the input voltage IN and in ambient temperature.

The driver 13, the SR flip-flop 14, the comparator 16, and the reference voltage generation unit 17, which are described above, function as a non-linear control type switching control unit that, in accordance with a result of a comparison between the feedback signal FB and the reference voltage REF, performs on/off control of a switch element (the transistors 11 and 12), and thereby generates the output voltage OUT from the input voltage IN.

On-Time Setting Unit (First Configuration Example)

Figure 2:
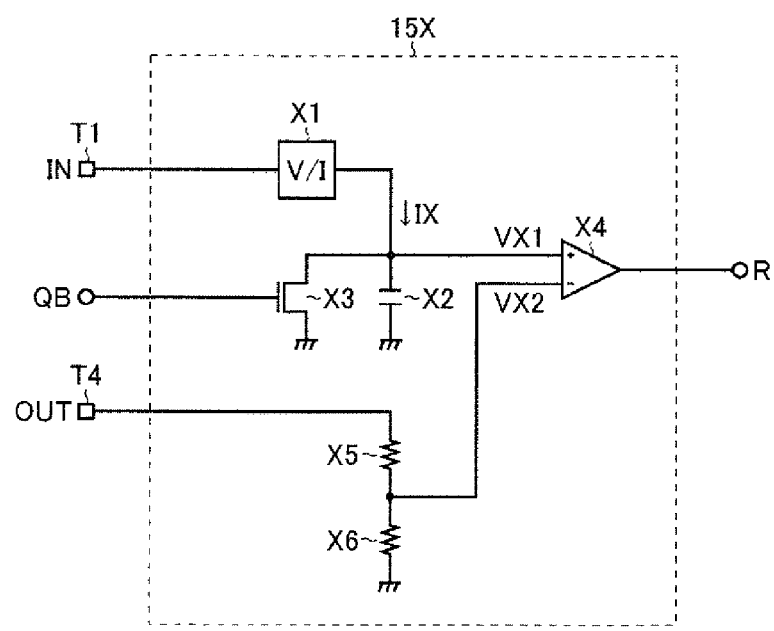
FIG. 2 is a diagram showing a first configuration example of an on-time setting unit.

FIG. 2 is a diagram showing a first configuration example of the on-time setting unit 15. An on-time setting unit 15X of the first configuration example includes a voltage/current conversion portion X1, a capacitor X2, an N-channel type MOS field-effect transistor X3, a comparator X4, and resistors X5 and X6.

The voltage/current conversion portion X1 generates a charge current IX (=a×IN) by performing a voltage/current conversion of the input voltage IN applied to the external terminal T1. A current value of the charge current IX varies with a voltage value of the input voltage IN. Specifically, the higher the input voltage IN is, the larger the charge current IX is, and the lower the input voltage IN is, the smaller the charge current IX is.

A first end of the capacitor X2 is connected to the voltage/current conversion portion X1. A second end of the capacitor X2 is connected to a ground terminal. When the transistor X3 is in an off state, the capacitor X2 is charged with the charge current IX, so that a first voltage VX1 appearing at the first end of the capacitor X2 increases. On the other hand, when the transistor X3 is in an on state, the capacitor X2 is discharged via the transistor X3, so that the first voltage VX1 decreases.

The transistor X3 is a charge/discharge switch for switching between charging and discharging of the capacitor X2 in accordance with on/off control of the transistors 11 and 12. A drain of the transistor X3 is connected to the first end of the capacitor X2. A source of the transistor X3 is connected to the ground terminal. A gate of the transistor X3 is connected to an input end of the inverted output signal QB.

The voltage/current conversion portion X1, the capacitor X2, and the transistor X3, which are described above, correspond to a first voltage generation circuit that generates the first voltage VX1 in accordance with a charge/discharge operation of the capacitor X2.

The comparator X4 compares the first voltage VX1 inputted to a non-inverted input terminal (+) thereof with a second voltage VX2 inputted to an inverted input terminal (−) thereof, and based on a result of the comparison, generates the reset signal R. If the first voltage VX1 is higher than the second voltage VX2, a resulting level of the reset signal R is high, and if the first voltage VX1 is lower than the second voltage VX2, a resulting level of the reset signal R is low.

A first end of the resistor X5 is connected to an external terminal T4 to which an output voltage OUT is applied. A second end of the resistor X5 is connected to a first end of the resistor X6. A second end of the resistor X6 is connected to the ground terminal. The resistors X5 and X6 correspond to a second voltage generation circuit that outputs, from a connection node between the resistors X5 and X6, the second voltage VX2 obtained by dividing the output voltage OUT.

Figure 3:
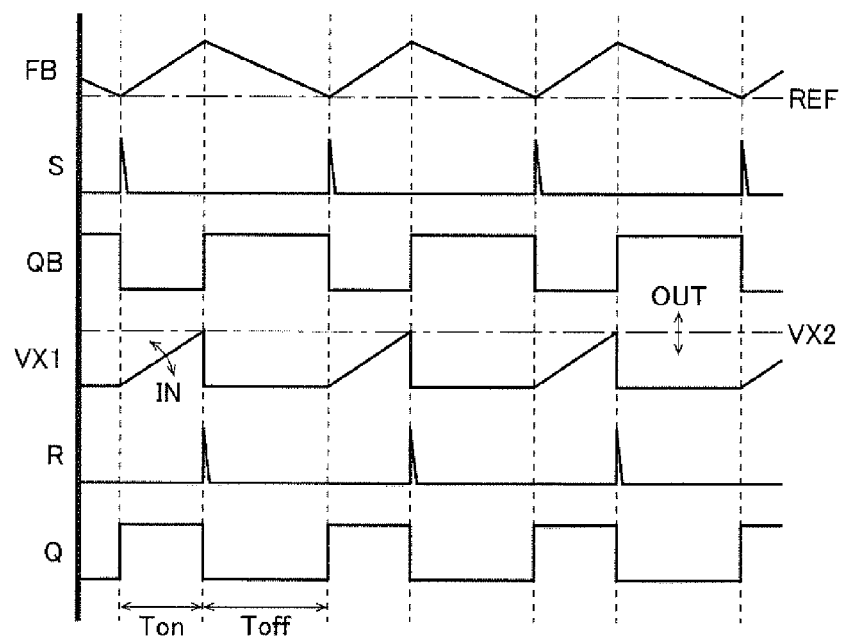
FIG. 3 is a timing chart for explaining an on-time setting operation of the first configuration example.

FIG. 3 is a timing chart for explaining an on-time setting operation of the first configuration example. In FIG. 3, in order from the top, the feedback voltage FB, the set signal S, the inverted output signal QB, the first voltage VX1, the reset signal R, and the output signal Q are depicted.

If, during an off-period of the transistor 11, the feedback voltage FB decreases to the reference voltage REF, the set signal S rises to a high level, and the output signal Q makes a transition to a high level. The transistor 11 thus is turned on, and the feedback voltage FB turns to increase. At this time, the transistor X3 is turned off as a result of the inverted output signal QB making a transition to a low level, and this causes the capacitor X2 to start being charged with the charge current IX. As described earlier, a current value of the charge current IX varies with a voltage value of the input voltage IN. The first voltage VX1, therefore, increases with a rate of increase (gradient) in accordance with the input voltage IN.

After that, upon the first voltage VX1 increasing to the second voltage VX2 (a division voltage obtained by dividing the output voltage OUT), the reset signal R rises to a high level, and the output signal Q makes a transition to a low level. The transistor 11 thus is turned off, and the feedback voltage FB turns to decrease again. At this time, the transistor X3 is turned on as a result of the inverted output signal QB making a transition to a high level. This causes the capacitor X2 to be quickly discharged via the transistor X3, so that the first voltage VX1 is lowered to a low level.

In accordance with the output signal Q, the driver 13 generates the gate signals G1 and G2, and uses them to perform on/off control of the transistors 11 and 12, respectively. As a result, a switch voltage SW having a rectangular waveform is outputted from the external terminal T2. The switch voltage SW is smoothed by the inductor L1 and the capacitor C1, and thus the output voltage OUT is generated. The output voltage OUT is divided by the resistors R1 and R2, and thus the earlier described feedback voltage FB is generated. With this output feedback control, the switching power supply device 1 generates from the input voltage IN the output voltage OUT of a desired level by using an extremely simple configuration.

Furthermore, the on-time setting unit 15X sets the on-time Ton not as a fixed value but as a variable value in accordance with the input voltage IN and the output voltage OUT. More specifically, the on-time setting unit 15X shortens the on-time Ton by increasing the rate of increase (gradient) of the first voltage VX1 with an increase in the input voltage IN, and lengthens the on-time Ton by decreasing the rate of increase (gradient) of the first voltage VX1 with a decrease in the input voltage IN. Furthermore, the on-time setting unit 15X shortens the on-time Ton by lowering the second voltage VX2 with a decrease in the output voltage OUT, and lengthens the on-time Ton by raising the second voltage VX2 with an increase in the output voltage OUT. In other words, the on-time setting unit 15X sets the on-time Ton to be inversely proportional to the input voltage IN and to be proportional to the output voltage OUT.

With this configuration, it is possible to suppress a variation in switching frequency without impairing advantages of non-linear control. This makes it possible to achieve improvements in output voltage accuracy and in load regulation characteristic and further to facilitate measures to prevent EMI and noise in set designing. Furthermore, it is also made possible to use, without any problem, the switching power supply device 1 as a power supply device for an application involving a large input voltage variation or for an application requiring various output voltages.

On-Time Setting Unit (Second Configuration Example)

In order to suppress a variation in switching frequency, the earlier described on-time setting unit 15X of the first configuration example monitors the input voltage IN and the output voltage OUT, and based on a result of the monitoring, sets the on-time Ton. Because of this, with the on-time setting unit 15X of the first configuration example, there is a need to provide the semiconductor device 10 additionally with the external terminal T4 for monitoring the output voltage OUT.

Furthermore, with the on-time setting unit 15X of the first configuration example, a calculation formula (1) for calculating a switching frequency f includes variables (the output voltage OUT, an output current IOUT, and on-resistances RON of the transistors 11 and 12), due to which a variation in the switching frequency f cannot be completely eliminated. In the calculation formula (1), C denotes a capacitance value (a constant) of the capacitor X2, and R5 and R6 denote resistance values (constants) of the resistors X5 and X6, respectively. Furthermore, DUTY denotes a duty of the switch voltage SW.

[Mathematical Formula 1]

$$f = \frac{DUTY}{Ton} \qquad (1)$$

$$= \frac{\frac{OUT + IOUT \cdot RON}{IN}}{\frac{C \cdot OUT \cdot \frac{R6}{R5+R6}}{A \cdot IN}}$$

$$= \alpha \cdot \frac{OUT + IOUT + RON}{OUT}$$

$$\text{※ } \alpha = \frac{A}{C \cdot \frac{R6}{R5+R6}} \quad (const.)$$

Figure 4:
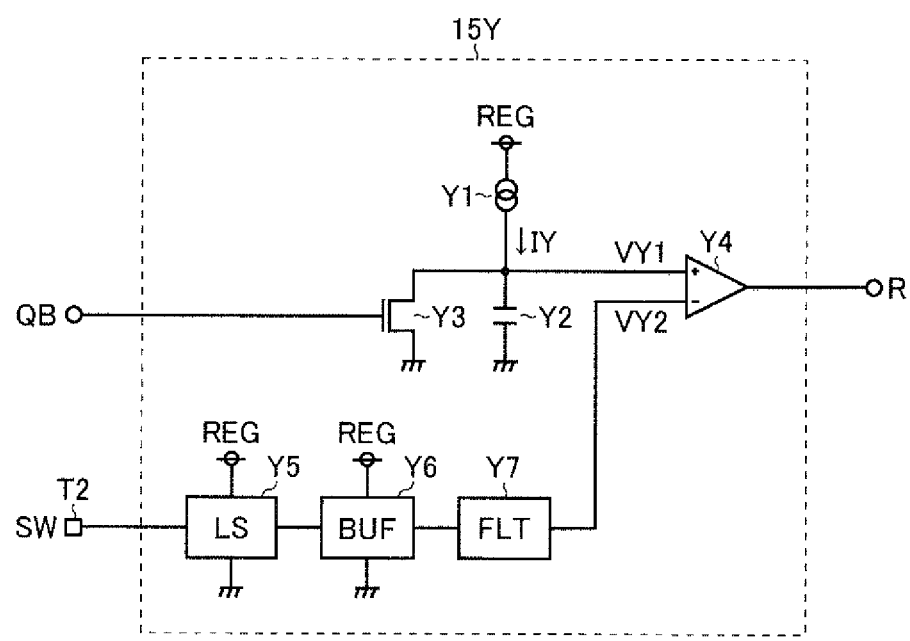
FIG. 4 is a diagram showing a second configuration example of the on-time setting unit.

FIG. 4 is a diagram showing a second configuration example of the on-time setting unit 15. An on-time setting unit 15Y of the second configuration example includes a constant current source Y1, a capacitor Y2, an N-channel type MOS field-effect transistor Y3, a comparator Y4, a level shifter Y5, a buffer Y6, and a filter Y7. The second configuration example is characterized by having the constant current source Y1 in place of the voltage/current conversion portion X1 and by having the level shifter Y5, the buffer Y6, and the filter Y7 in place of the resistors X5 and X6.

The constant current source Y1 operates by being supplied with an internal power supply voltage REG (for example, 5 V) that is constant irrespective of variations in the input voltage IN and in ambient temperature, and generates a charge current IY that is constant irrespective of the input voltage IN.

A first end of the capacitor Y2 is connected to the constant current source Y1. A second end of the capacitor Y2 is connected to a ground terminal. When the transistor Y3 is in an off state, the capacitor Y2 is charged with the charge current IY, so that a first voltage VY1 appearing at the first end of the capacitor Y2 increases. On the other hand, when the transistor Y3 is in an on state, the capacitor Y2 is discharged via the transistor Y3, so that the first voltage VY1 decreases.

The transistor Y3 is a charge/discharge switch for switching between charging and discharging of the capacitor Y2 in accordance with on/off control of the transistors 11 and 12. A drain of the transistor Y3 is connected to the first end of the capacitor Y2. A source of the transistor Y3 is connected to the ground terminal. A gate of the transistor Y3 is connected to an input end of the inverted output signal QB.

The constant current source Y1, the capacitor Y2, and the transistor Y3, which are described above, correspond to a first voltage generation circuit that generates the first voltage VY1 in accordance with a charge/discharge operation of the capacitor Y2.

The comparator Y4 compares the first voltage VY1 inputted to a non-inverted input terminal (+) thereof with a second voltage VY2 inputted to an inverted input terminal (−) thereof, and based on a result of the comparison, generates the reset signal R. If the first voltage VY1 is higher than the second voltage VY2, a resulting level of the reset signal R is high, and if the first voltage VY1 is lower than the second voltage VY2, a resulting level of the reset signal R is low.

The level shifter Y5 operates by being supplied with the internal power supply voltage REG and performs level shifting with respect to the switch voltage SW applied to the external terminal T2. To be specific, upon receipt of input of the switch voltage SW that is pulse-driven between the input voltage IN (to be more precise, IN−IOUT×RON) and a ground voltage GND, the level shifter Y5 outputs a voltage signal that is to be pulse-driven between the internal power supply voltage REG and the ground voltage GND. A withstand voltage of an element constituting the level shifter Y5 could be set as appropriate in accordance with a voltage difference between the input voltage IN and the internal power supply voltage REG.

The buffer Y6 operates by being supplied with the internal power supply voltage REG and performs waveform shaping of an output from the level shifter Y5. In a case where priority is placed on a reduction in circuit size of the on-time setting unit 15Y, the buffer Y6 may be omitted.

The filter Y7 generates the second voltage VY2 by smoothing an output from the buffer Y6. As the filter Y7, for example, a CR filter that is composed of a capacitor and a resistor can be used.

The level shifter Y5, the buffer Y6, and the filter Y7, which are described above, correspond to a second voltage generation circuit that generates the second voltage VY2 in accordance with a duty of the switch voltage SW.

Figure 5:
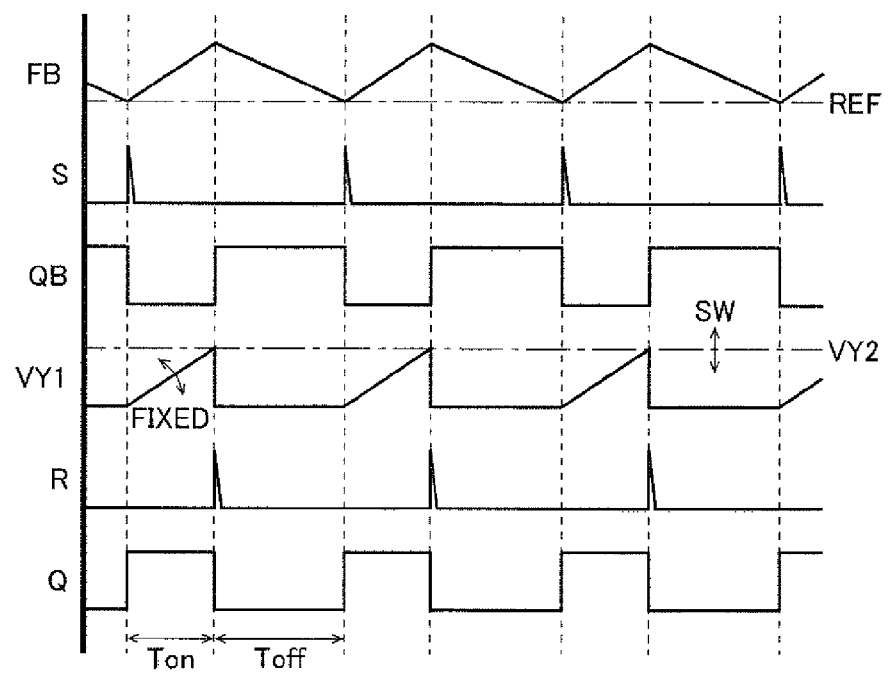
FIG. 5 is a timing chart for explaining an on-time setting operation of the second configuration example.

FIG. 5 is a timing chart for explaining an on-time setting operation of the second configuration example. In FIG. 5, in order from the top, the feedback voltage FB, the set signal S, the inverted output signal QB, the first voltage VY1, the reset signal R, and the output signal Q are depicted.

If, during an off-period of the transistor 11, the feedback voltage FB decreases to the reference voltage REF, the set signal S rises to a high level, and the output signal Q makes a transition to a high level. The transistor 11 thus is turned on, and the feedback voltage FB turns to increase. At this time, the transistor Y3 is turned off as a result of the inverted output signal QB making a transition to a low level, and this causes the capacitor Y2 to start being charged with the charge current IY. As described earlier, a current value of the charge current IY is fixed irrespective of the input voltage IN. The first voltage VY1, therefore, increases with a rate of increase (gradient) that is constant irrespective of the input voltage IN.

After that, upon the first voltage VY1 increasing to the second voltage VY2 (a pseudo output voltage as the output voltage OUT, whose voltage value varies with a duty of the switch voltage SW), the reset signal R rises to a high level, and the output signal Q makes a transition to a low level. The transistor 11 thus is turned off, and the feedback voltage FB turns to decrease again. At this time, the transistor Y3 is turned on as a result of the inverted output signal QB making a transition to a high level. This causes the capacitor Y2 to be quickly discharged via the transistor Y3, so that the first voltage VY1 is lowered to a low level.

In accordance with the output signal Q, the driver 13 generates the gate signals G1 and G2, and uses them to perform on/off control of the transistors 11 and 12, respectively. As a result, the switch voltage SW having a rectangular waveform is outputted from the external terminal T2. The switch voltage SW is smoothed by the inductor L1 and the capacitor C1, and thus the output voltage OUT is generated. The output voltage OUT is divided by the resistors R1 and R2, and thus the earlier described feedback voltage FB is generated. With this output feedback control, the switching power supply device 1 generates from the input voltage IN the output voltage OUT of a desired level by using an extremely simple configuration. There is no difference in this regard from the foregoing first configuration example.

Furthermore, the on-time setting unit 15Y sets the on-time Ton not as a fixed value but as a variable value in accordance with a duty (=(OUT+IOUT×RON)/IN) of the switch voltage SW. More specifically, the on-time setting unit 15Y lengthens the on-time Ton by raising the second voltage VY2 with an increase in duty of the switch voltage SW, and shortens the on-time Ton by lowering the second voltage VY2 with a decrease in duty of the switch voltage SW. In other words, the on-time setting unit 15Y sets the on-time Ton to be inversely proportional to the input voltage IN and to be proportional to (OUT+IOUT×RON).

For example, when the input voltage IN increases or the output voltage OUT decreases, or when the output current IOUT increases, so that there occurs an increase in duty of the switch voltage SW, the second voltage VY2 is raised to lengthen the on-time Ton. Conversely, when the input voltage IN decreases or the output voltage OUT increases, or when the output current IOUT decreases, so that there occurs a decrease in duty of the switch voltage SW, the second voltage VY2 is lowered to shorten the on-time Ton.

With this configuration, similarly to the foregoing first configuration example, it is possible to suppress a variation in switching frequency without impairing advantages of non-linear control. This makes it possible to achieve improvements in output voltage accuracy and in load regulation characteristic and further to facilitate measures to prevent EMI and noise in set designing. Furthermore, it is also made possible to use, without any problem, the switching power supply device 1 as a power supply device for an application involving a large input voltage variation or for an application requiring various output voltages.

Furthermore, in order to suppress a variation in switching frequency, the on-time setting unit 15Y of the second configuration example monitors the switch voltage SW, and based on a result of the monitoring, sets the on-time Ton. Thus, unlike the foregoing first configuration example, there is eliminated the need to provide the semiconductor device 10 additionally with the external terminal T4 for monitoring the output voltage OUT.

Furthermore, with the on-time setting unit 15Y of the second configuration example, a calculation formula (2) for calculating the switching frequency f includes no variables, and thus a variation in the switching frequency f can be completely eliminated. In the calculation formula (2), C denotes a capacitance value (a constant) of the capacitor Y2, and DUTY denotes a duty of the switch voltage SW.

[Mathematical Formula 2]

$$f = \frac{DUTY}{Ton} \\ = \frac{DUTY}{\frac{REG \cdot C \cdot DUTY}{IY}} \\ = \frac{IY}{REG \cdot C} \\ = \beta \ (const.) \qquad (2)$$

Second Embodiment

[Overall Configuration]

Figure 6:
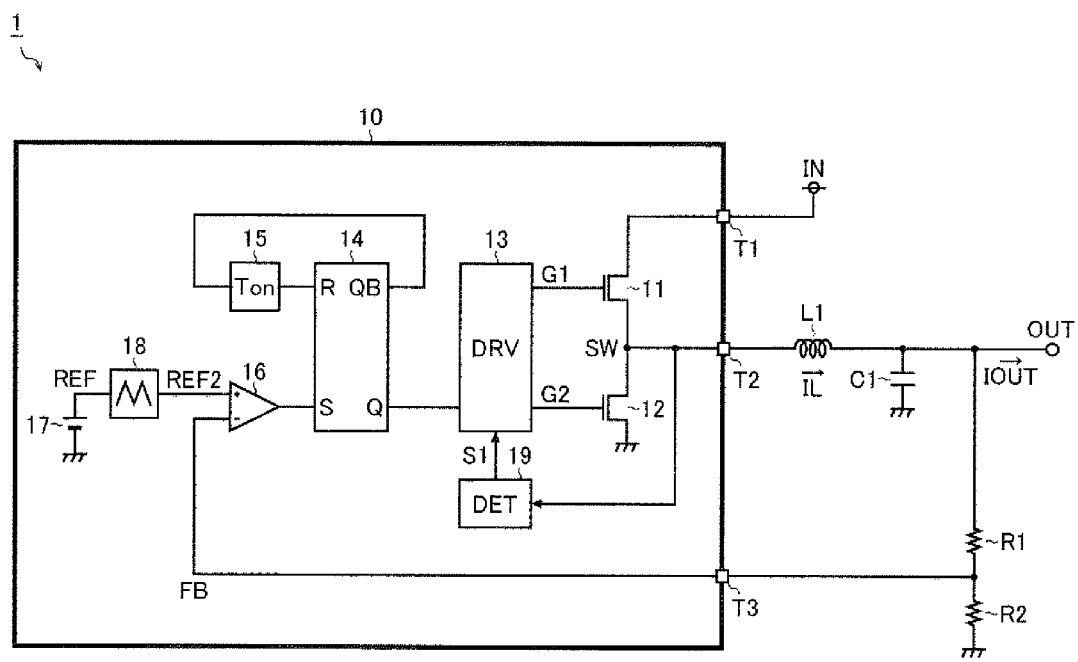
FIG. 6 is a block diagram showing a second embodiment of the switching power supply device.

FIG. 6 is a block diagram showing a second embodiment of the switching power supply device. A switching power supply device 1 of the second embodiment is characterized by a configuration based on the foregoing first embodiment, to which a ripple injection unit 18 and a backflow current detection unit 19 are added.

The ripple injection unit 18 injects into a reference voltage REF a ripple component generated by using a gate signal G1 and a switch voltage SW, and outputs to a non-inverted input terminal (+) of a comparator 16 a reference voltage REF2 obtained by the ripple injection. With this ripple injection technique introduced, even when a ripple component of an output voltage OUT (accordingly, of a feedback voltage FB) is not so large, stable switching control can be performed, and thus it is made possible to use, as a capacitor C1, for example, a laminated ceramic capacitor having a small ESR (equivalent series resistance).

The backflow current detection unit 19 monitors a backflow current flowing to a transistor 12 (a coil current IL when flowing back from a coil L1 to a ground terminal via the transistor 12), and based on a result of the monitoring, generates a backflow detection signal S1. At a point in time when a backflow current flowing to the transistor 12 is detected, the backflow detection signal S1 is latched to a high level (a logic level in a case of a backflow being detected), and at a rising edge of the gate signal G1 in a next cycle, the backflow detection signal S1 is reset to a low level (a logic level in a case of a backflow not being detected). A backflow current could be monitored by, for example, detecting a zero cross point at which the switch voltage SW changes from a negative voltage to a positive voltage during an on-period of the transistor 12. A driver 13 generates such a gate signal G2 as to cause, when the backflow detection signal S1 is at a high level, the transistor 12 to be forcibly turned off irrespective of an output signal Q.

Figure 7:
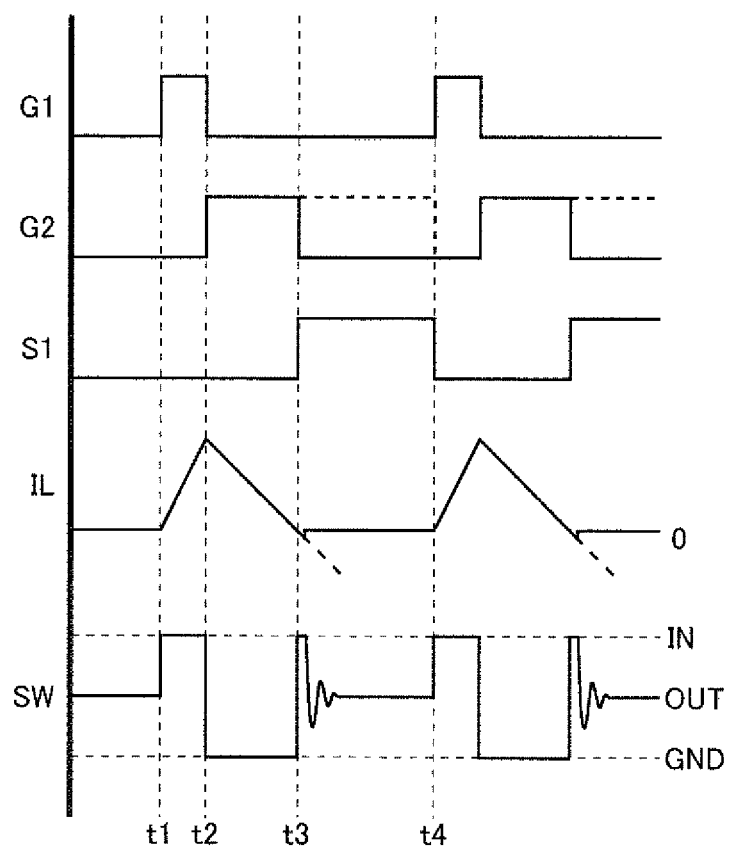
FIG. 7 is a timing chart for explaining a switching stop operation in a case of a light load.

FIG. 7 is a timing chart for explaining a switching stop operation in a case of a light load, in which, in order from the top, the gate signals G1 and G2, the backflow detection signal S1, the coil current IL, and the switch voltage SW are depicted.

In a period from a time t1 to a time t2, the gate signal G1 is at a high level, and the gate signal G2 is at a low level, so that a transistor 11 is turned on, and the transistor 12 is turned off. Thus, in the period from the time t1 to the time t2, the switch voltage SW increases approximately to an input voltage IN, and the coil current IL increases.

At the time t2, the gate signal G1 falls to a low level, and the gate signal G2 rises to a high level, so that the transistor 11 is turned off, and the transistor 12 is turned on. Thus, the switch voltage SW decreases approximately to a ground voltage GND, and the coil current IL turns to decrease.

Herein, if an output current IOUT flowing to a load is sufficiently large, until a time t4 when the gate signal G1 rises again to a high level, the coil current IL continues to flow toward the load without falling below a zero value. On the other hand, in the case of a light load, where the output current IOUT flowing to the load is small, the amount of energy stored in the coil L1 is small, so that at a time t3, the coil current IL falls below the zero value to cause a backflow current to flow to the transistor 12. Such a state is the same as discarding electric charge to the ground terminal, leading to a decrease in efficiency in the case of a light load.

As a solution to this, the switching power supply device 1 of the second embodiment has a configuration in which a backflow current flowing to the transistor 12 is detected by using the backflow current detection unit 19, and at the time t3 when the backflow detection signal S1 rises to a high level, the transistor 12 is forcibly turned off. This configuration makes it possible to prevent a decrease in efficiency in the case of a light load.

Furthermore, in the switching power supply device 1 of the second embodiment, in order to perform switching stop control in the case of a backflow current being detected, some changes are made to an internal configuration of the on-time setting unit 15. The following describes in detail a third configuration example of the on-time setting unit 15 with reference to FIG. 8.

On-Time Setting Unit (Third Configuration Example)

Figure 8:
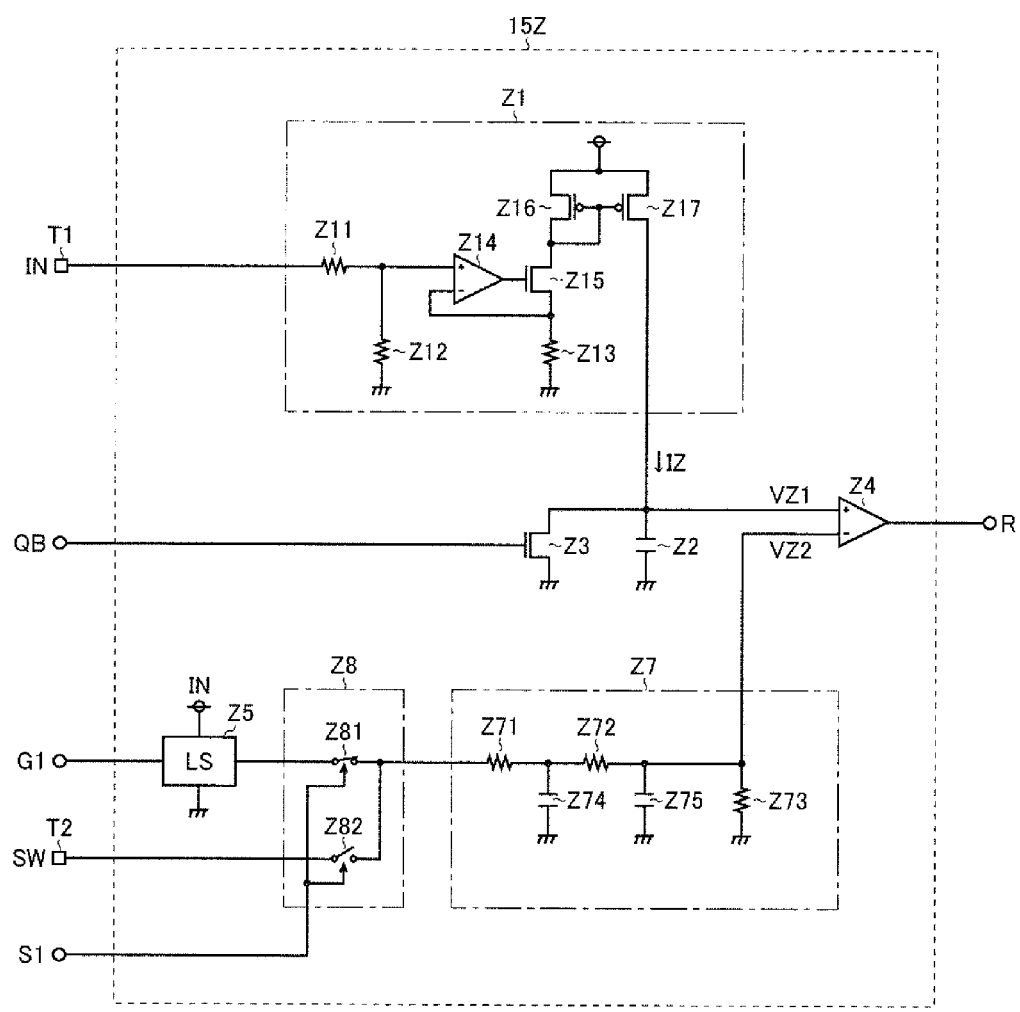
FIG. 8 is a diagram showing a third configuration example of the on-time setting unit.

FIG. 8 is a diagram showing the third configuration example of the on-time setting unit. An on-time setting unit 15Z of the third configuration example includes a voltage/current conversion portion Z1, a capacitor Z2 (a capacitance value CZ2), an N-channel type MOS field-effect transistor Z3, a comparator Z4, a level shifter Z5, a filter Z7, and a selector Z8. The third configuration example is characterized by a configuration obtained by combining the first voltage generation circuit (X1, X2, and X3) of the first configuration example with the second voltage generation circuit (Y5, (Y6), and Y7) of the second configuration example, which further includes the selector Z8.

The voltage/current conversion portion Z1 is a circuit block that generates a charge current IZ ($=a \times IN$) by performing a voltage/current conversion of the input voltage IN applied to the external terminal T1, and includes resistors Z11 to Z13 (resistance values RZ11 to RZ13), an operational amplifier Z14, an N-channel type MOS field-effect transistor Z15, and P-channel type MOS field-effect transistors Z16 and Z17.

A first end of the resistor Z11 is connected to the external terminal T1. A second end of the resistor Z11 and a first end of the resistor Z12 are both connected to a non-inverted input terminal (+) of the operational amplifier Z14. A second end of the resistor Z12 is connected to a ground terminal. An inverted input terminal (−) of the operational amplifier Z14 is connected to a source of the transistor Z15 and to a first end of the resistor Z13. A second end of the resistor Z13 is connected to the ground terminal. An output terminal of the operational amplifier Z14 is connected to a gate of the transistor Z15. A drain of the transistor Z15 is connected to a drain of the transistor Z16. A source of the transistor Z16 and a source of the transistor Z17 are both connected to a power terminal. A gate of the transistor Z16, together with a gate of the transistor Z17, is connected to the drain of the transistor Z16. A drain of the transistor Z17 is connected as an output end of the charge current IZ to a first end of the capacitor Z2.

As shown by a formula (3) below, the higher the input voltage IN is, the larger the charge current IZ is, and the lower the input voltage IN is, the smaller the charge current IZ is.

[Mathematical Formula 3]

$$IZ = \left( \frac{RZ12 \cdot RZ13}{RZ11 + RZ12} \right) \cdot IN \qquad (3)$$

The first end of the capacitor Z2 is connected to the voltage/current conversion portion Z1. A second end of the capacitor Z2 is connected to the ground terminal. When the transistor Z3 is in an off state, the capacitor Z2 is charged with the charge current IZ, so that a first voltage VZ1 appearing at the first end of the capacitor Z2 increases. On the other hand, when the transistor Z3 is in an on state, the capacitor Z2 is discharged via the transistor Z3, so that the first voltage VZ1 decreases.

The transistor Z3 is a charge/discharge switch for switching between charging and discharging of the capacitor Z2 in accordance with on/off control of the transistors 11 and 12. A drain of the transistor Z3 is connected to the first end of the capacitor Z2. A source of the transistor Z3 is connected to the ground terminal. A gate of the transistor Z3 is connected to an input end of the inverted output signal QB.

The voltage/current conversion portion Z1, the capacitor Z2, and the transistor Z3, which are described above, correspond to a first voltage generation circuit that generates the first voltage VZ1 in accordance with a charge/discharge operation of the capacitor Z2.

The comparator Z4 compares the first voltage VZ1 inputted to a non-inverted input terminal (+) thereof with a second voltage VZ2 inputted to an inverted input terminal (−) thereof, and based on a result of the comparison, generates the reset signal R. If the first voltage VZ1 is higher than the second voltage VZ2, a resulting level of the reset signal R is high, and if the first voltage VZ1 is lower than the second voltage VZ2, a resulting level of the reset signal R is low. Considering that a charge operation of the capacitor Z2 is started concurrently with turning on of the transistor 11, and the transistor 11 is turned off with a rising edge of the reset signal R used as a trigger, the on-time Ton is calculated by a formula (4) below.

[Mathematical Formula 4]

$$Ton = \frac{CZ2}{IZ} \cdot VZ2 \qquad (4)$$

The level shifter Z5 operates by being supplied with the input voltage IN and performs level shifting with respect to the gate signal G1. To be specific, upon receipt of input of the gate signal G1, the level shifter Z5 outputs a voltage signal that is to be pulse-driven between the input voltage IN and the ground voltage GND. A withstand voltage of an element constituting the level shifter Z5 could be set as appropriate in accordance with a voltage difference between the input voltage IN and the ground voltage GND.

The filter Z7 is a circuit block that generates the second voltage VZ2 by smoothing an output from the selector Z8, and includes resistors Z71 to Z73 and capacitors Z74 and Z75. A first end of the resistor Z71 is connected to an output terminal of the selector Z8. A second end of the resistor Z71 is connected to a first end of the resistor Z72 and to a first end of the capacitor Z74. A second end of the capacitor Z74 is connected to the ground terminal. A second end of the resistor Z72 is connected to each of the inverted input terminal (−) of the comparator Z4, a first end of the resistor Z73, and a first end of the capacitor Z5. A second end of the resistor Z73 and a second end of the capacitor Z75 are both connected to the ground terminal.

As described above, the filter Z7 includes a CR filter circuit composed of the resistors Z71 and Z72 and the capacitors Z74 and Z75. The number of stages of the CR filter circuit (two stages in FIG. 8) can be arbitrarily increased or decreased.

Furthermore, the filter Z7 includes the resistor Z73 that, together with the resistors Z71 and Z72 as constituent components of the CR filter circuit, constitutes a voltage division circuit. While FIG. 8 exemplarily shows a configuration in which a connection node between the resistor Z72 and the resistor Z73 is used as an output terminal of the filter Z7, the filter Z7 is not limited to this configuration and may have, for example, a configuration in which the resistor Z73 is provided between the first end of the resistor Z71 and the ground terminal, and a connection node between the resistor Z71 and the resistor Z73 is used as an input terminal of the filter Z7.

The selector Z8 is a circuit block that, in accordance with the backflow detection signal S1, in the case of a backflow current not being detected, selectively outputs the gate signal G1 after having been subjected to level shifting, and in the case of a backflow current being detected, selectively outputs the switch voltage SW, and includes switches Z81 and Z82. In the case of a backflow current being detected, both of the transistors 11 and 12 are turned off, so that the switch voltage SW becomes equal to the output voltage OUT.

In accordance with the backflow detection signal S1, the switch Z81 establishes/interrupts conduction between an output terminal of the level shifter Z5 and the input terminal of the filter Z7. To be more specific, when the backflow detection signal S1 is at a low level (a logic level in the case of a backflow not being detected), the switch Z81 is switched on, and when the backflow detection signal S1 is at a high level (a logic level in the case of a backflow being detected), the switch Z81 is switched off.

As for the switch Z82, on the other hand, in accordance with the backflow detection signal S1, the switch Z82 establishes/interrupts conduction between the external terminal T2 and the input terminal of the filter Z7. To be more specific, when the backflow detection signal S1 is at a low level, the switch Z82 is switched off, and when the backflow detection signal S1 is a high level, the switch Z82 is switched on.

A configuration in which the switch voltage SW is supplied to the comparator Z4 via the filter Z7 make it possible to remove, through the use of the filter Z7, ringing noise superimposed on the switch voltage SW. The on-time setting unit 15Z, however, is not limited to this configuration and may have a configuration in which the switch voltage SW is supplied directly to the comparator Z4.

The level shifter Z5, the filter Z7, and the selector Z8, which are described above, correspond to a second voltage generation circuit that, in the case of a backflow current not being detected, generates the second voltage VZ2 in accordance with an on duty of the transistor 11, and in the case of a backflow current being detected, generates the second voltage VZ2 in accordance with the switch voltage SW (accordingly, the output voltage OUT).

An operation of the on-time setting unit 15Z configured as above will be described in detail separately for the case of a backflow current not being detected (continuous mode) and for the case of a backflow current being detected (light load mode).

First, a detailed description is given of the case of a backflow current not being detected (continuous mode). In the case of a backflow current not being detected (continuous mode), the backflow detection signal S1 becomes low in level, and thus the selector Z8 selectively outputs the gate signal G1 after having been subjected to level shifting to the filter Z7. The second voltage VZ2 generated this time is expressed by a formula (5) below.

[Mathematical Formula 5]

$$VZ2 = IN \times DUTY \quad (5)$$
$$= IN \times \left( \frac{OUT + IOUT \cdot RON}{IN} \right)$$

Thus, by substituting the formula (3) and the formula (5) into the aforementioned formula (4), the on-time Ton can be calculated by a formula (6) below.

[Mathematical Formula 6]

$$Ton = \frac{CZ2}{\left( \frac{RZ12 \cdot RZ13}{RZ11 + RZ12} \right) \cdot IN} \cdot IN \cdot \left( \frac{OUT + IOUT \cdot RON}{IN} \right) \quad (6)$$
$$= \gamma \cdot \left( \frac{OUT + IOUT \cdot RON}{IN} \right)$$
$$\text{※ } \gamma = \frac{CZ2}{\left( \frac{RZ12 \cdot RZ13}{RZ11 + RZ12} \right)} \quad (const.)$$

That is, in the case of a backflow current not being detected (continuous mode), the on-time Ton is set as a variable value in accordance with an on duty (=(OUT+IOUT×RON)/IN) of the transistor 11. The thus described on-time Ton is set by an operation similar to the operation used in the foregoing second configuration example.

Next, a detailed description is given of the case of a backflow current being detected (light load mode). In the case of a backflow current being detected (light load mode), the backflow detection signal S1 becomes high in level, and thus the selector Z8 selectively outputs the switch voltage SW (accordingly, the output voltage OUT) to the filter Z7. Hence, as the second voltage VZ2, the switch voltage SW (accordingly, the output voltage OUT) itself is used, and the on-time Ton is calculated by a formula (7) below.

[Mathematical Formula 7]

$$Ton = \frac{CZ2}{\left( \frac{RZ12 \cdot RZ13}{RZ11 + RZ12} \right) \cdot IN} \cdot OUT \quad (7)$$
$$= \gamma \cdot \left( \frac{OUT}{IN} \right)$$
$$\text{※ } \gamma = \frac{CZ2}{\left( \frac{RZ12 \cdot RZ13}{RZ11 + RZ12} \right)} \quad (const.)$$

That is, in the case of a backflow current being detected (light load mode), the on-time Ton is set as a variable value in accordance with the input voltage IN and the output voltage OUT. The thus described on-time Ton is set by an operation similar to the operation used in the foregoing first configuration example.

As described above, the on-time setting unit 15Z of the third configuration example has a configuration obtained by combining the first voltage generation circuit (X1, X2, and X3) of the first configuration example with the second voltage generation circuit (Y5, (Y6), Y7) of the second configuration example, in which in the case of a backflow current being detected (in a case of switching being stopped), the second voltage VZ2 is maintained at the switch voltage SW (accordingly, the output voltage OUT).

This configuration makes it possible to avoid malfunctions due to switching stop control performed in the case of a backflow current being detected, without impairing advantages (such as fixing a switching frequency, achieving improvements in output voltage accuracy and in load regulation characteristic, facilitating measures to prevent EMI and noise in set designing, and reducing the number of external terminals used) similar to those provided by the first configuration example and the second configuration example.

Figure 9:
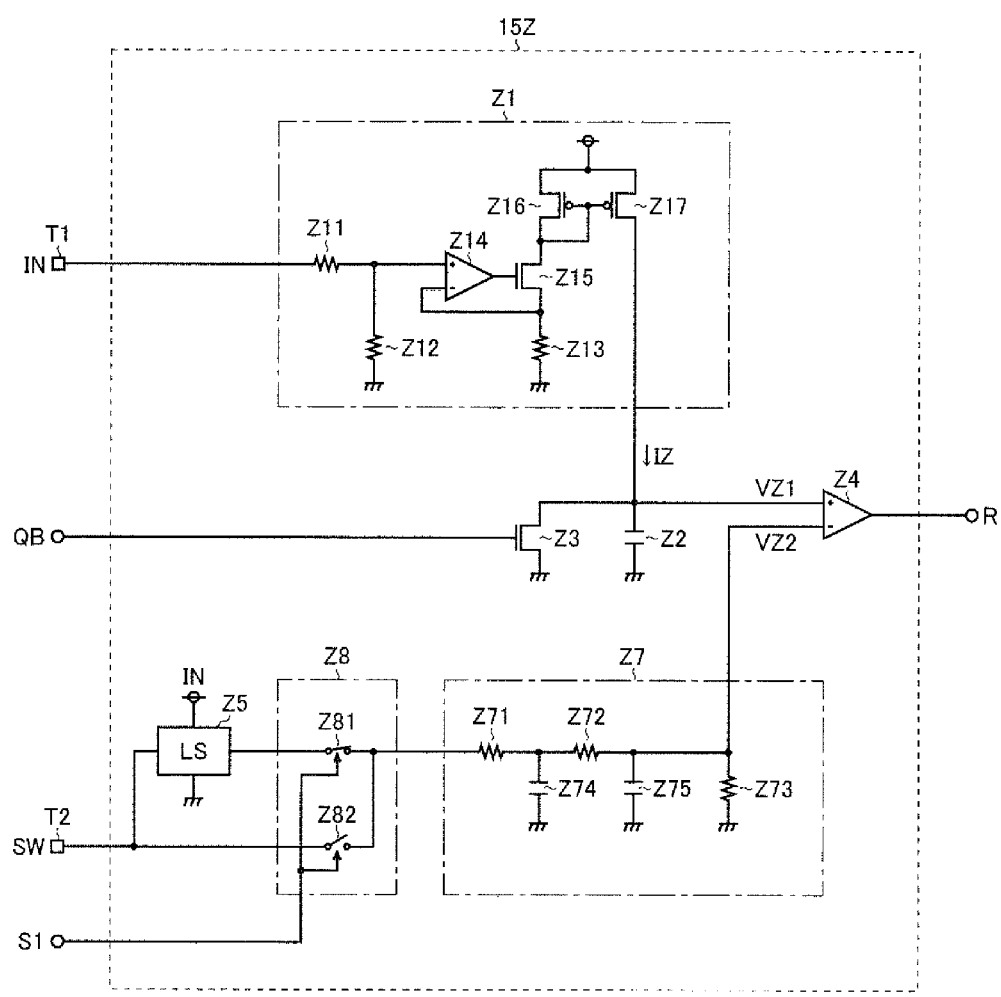
FIG. 9 is a diagram showing a modification example of the on-time setting unit.

While the description with reference to FIG. 8 exemplarily uses a configuration in which the gate signal G1 is inputted to the level shifter Z5, the on-time setting unit 15Z is not limited to this configuration and may have, for example, a configuration shown in FIG. 9, in which the switch voltage SW is inputted to the level shifter Z5.

[Improvement in Load Transient Characteristic in Case of Increased Load]

Figure 10:
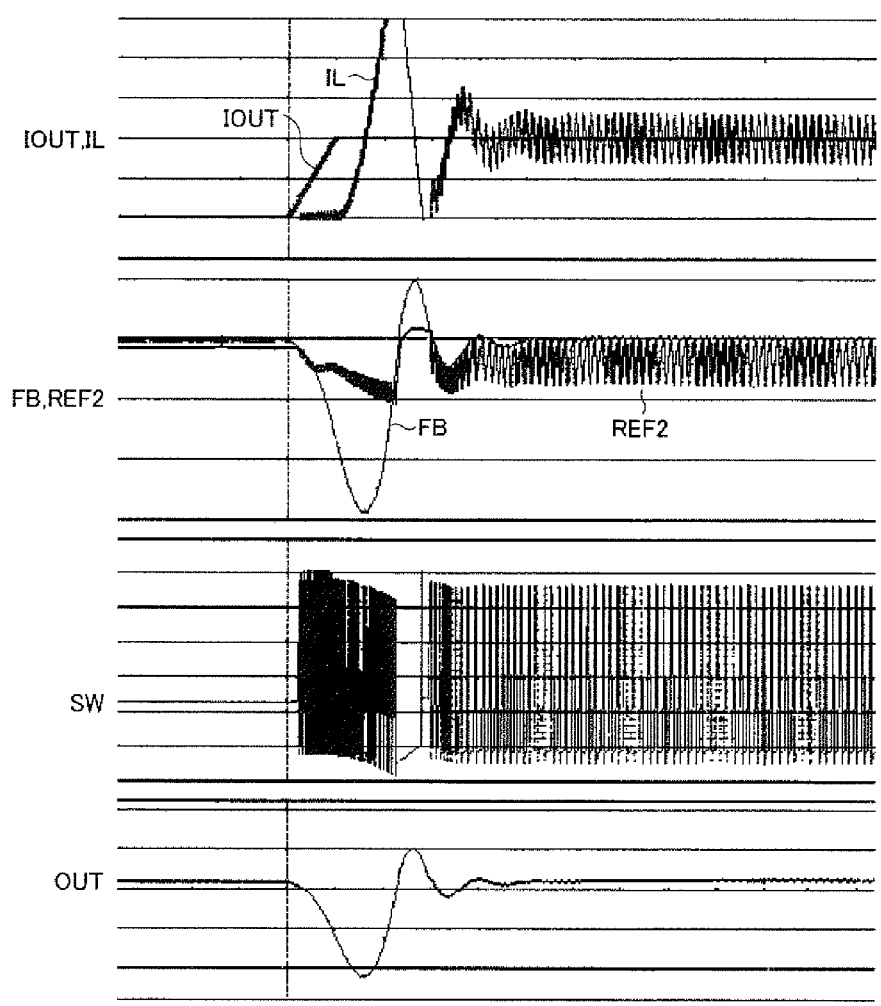
FIG. 10 is a timing chart for explaining a deterioration in load transient characteristic in a case of an increased load.
Figure 11:
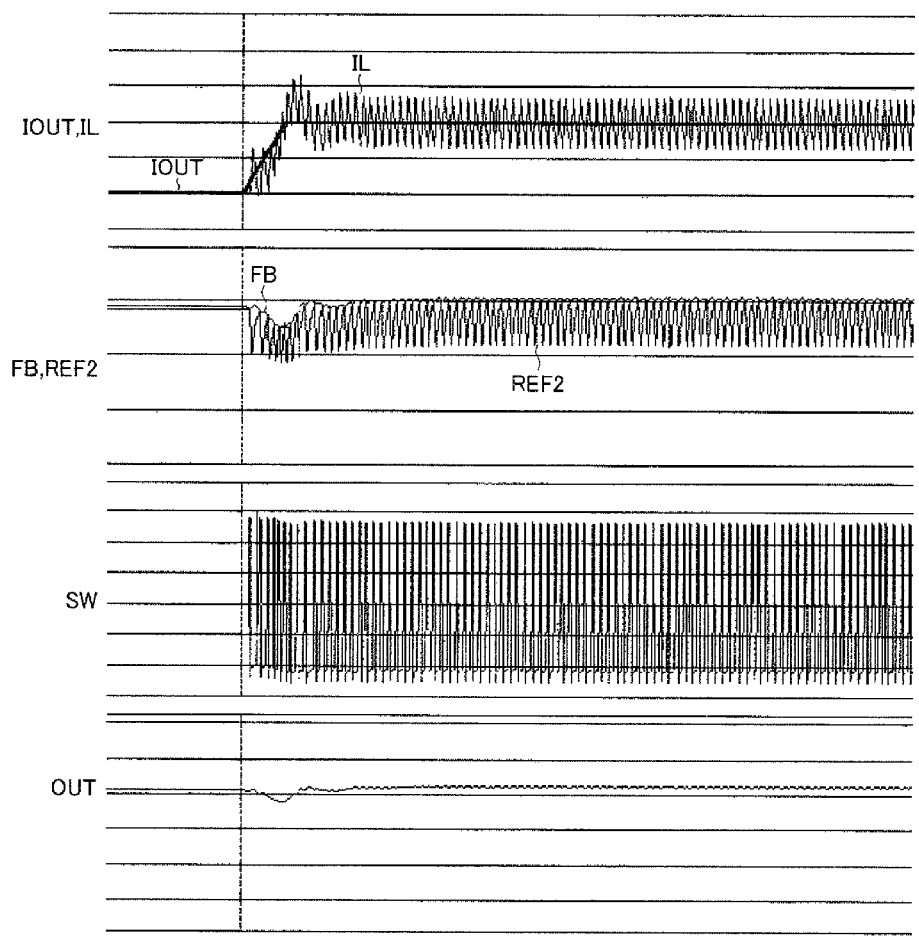
FIG. 11 is a timing chart for explaining an improvement in load transient characteristic in the case of an increased load.

Each of FIGS. 10 and 11 is a timing chart showing a load transient characteristic in a case of an increased load, in which, in order from the top, the output current IOUT and the coil current IL, the feedback voltage FB and the reference voltage REF2, the switch voltage SW, and the output voltage OUT are depicted. FIG. 10 shows a state where the load transient characteristic is deteriorated when the on-time setting unit 15Y of the second configuration example is used, and FIG. 11 shows a state where the load transient characteristic is improved when the on-time setting unit 15Z of the third configuration example is used.

In the switching power supply device 1 of the second embodiment in which a switching operation is stopped in the case of a backflow current being detected (light load mode), with the on-time setting unit 15Y of the second configuration example adopted, when switching is stopped, the second voltage VY2 decreases, so that the on-time Ton becomes extremely short. In such a state, an abrupt change from a light load to a heavy load (a sharp increase in the output current IOUT) cannot be accommodated, as a result of which there occurs a significant drop in the output voltage OUT (see FIG. 10).

On the other hand, with the on-time setting unit 15Z of the third configuration example adopted, when switching is stopped, as the second voltage VZ2, the switch voltage SW (accordingly, the output voltage OUT) is inputted, so that the on-time Ton is maintained at an appropriate length in accordance with the input voltage IN and the output voltage OUT. This allows even a sharp load increase to be quickly accommodated, thus making it possible to substantially reduce the amount of a drop in the output voltage OUT (see FIG. 11).

[Improvement in Efficiency in Light Load Mode]

Figure 12:
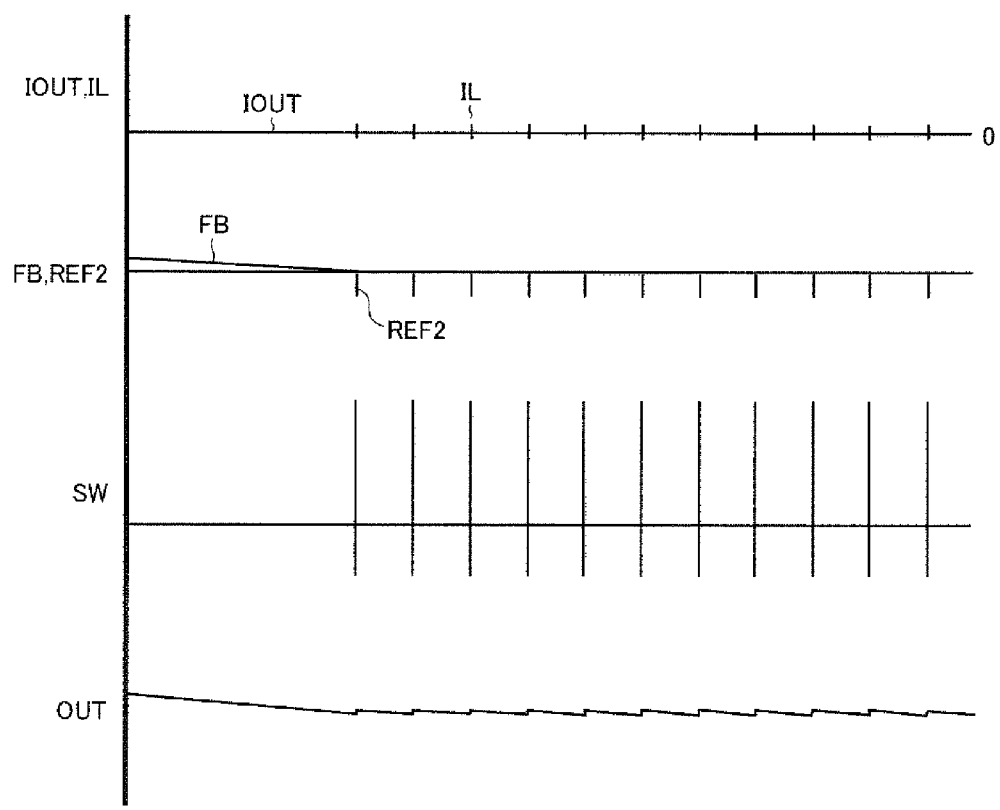
FIG. 12 is a timing chart for explaining a deterioration in efficiency in a light load mode.
Figure 13:
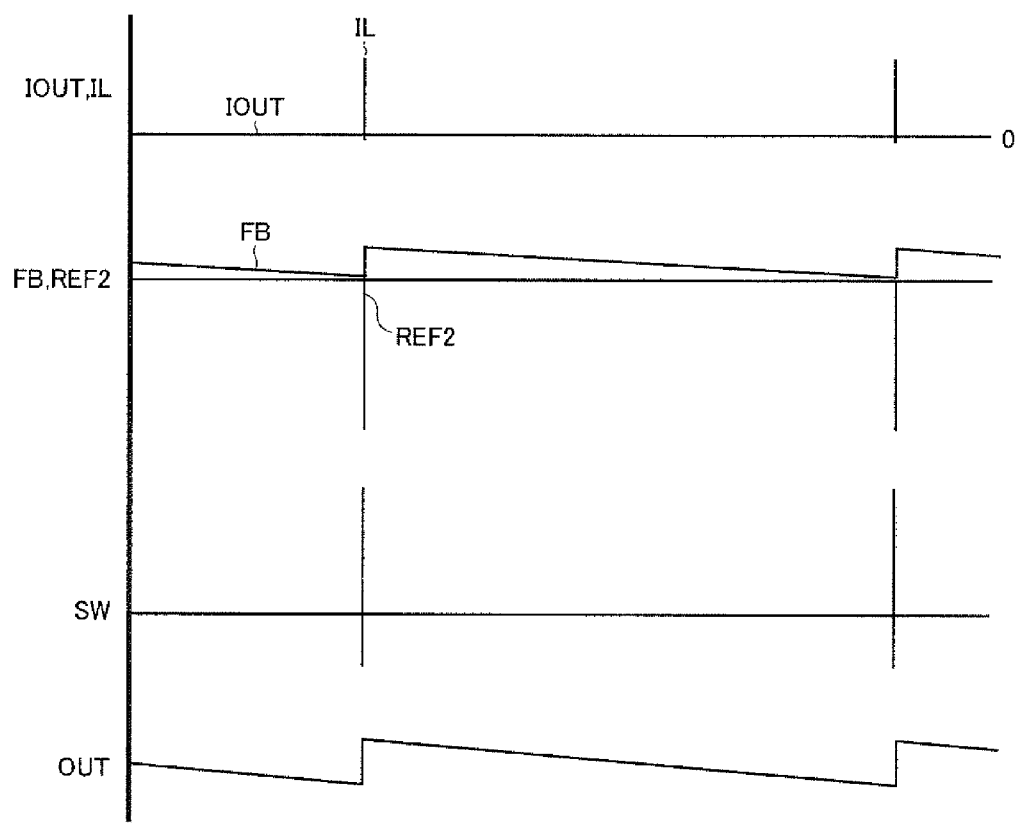
FIG. 13 is a timing chart for explaining an improvement in efficiency in the light load mode.

Each of FIGS. 12 and 13 is a timing chart showing a switching operation in the light load mode, in which, in order from the top, the output current IOUT and the coil current IL, the feedback voltage FB and the reference voltage REF2, the switch voltage SW, and the output voltage OUT are depicted. FIG. 12 shows a state where efficiency is deteriorated when the on-time setting unit 15Y of the second configuration example is used, and FIG. 13 shows a state where the efficiency is improved when the on-time setting unit 15Z of the third configuration example is used.

As described earlier, in the switching power supply device 1 of the second embodiment in which a switching operation is stopped in the case of a backflow current being detected (light load mode), with the on-time setting unit 15Y of the second configuration example adopted, when switching is stopped, the second voltage VY2 decreases, so that the on-time Ton becomes extremely short. In such a state, energy supplied to the coil L1 per one switching operation is decreased to such an extent that the output voltage OUT can hardly be raised, as a result of which the number of times of switching required to maintain the output voltage OUT is needlessly increased to deteriorate the efficiency (see FIG. 12).

On the other hand, with the on-time setting unit 15Z of the third configuration example adopted, when switching is stopped, as the second voltage VZ2, the switch voltage SW (accordingly, the output voltage OUT) is inputted, so that the on-time Ton is maintained at an appropriate length in accordance with the input voltage IN and the output voltage OUT. Thus, energy supplied to the coil L1 per one switching operation is increased to such an extent that the output voltage OUT can be sufficiently raised, so that the number of times of switching required to maintain the output voltage OUT can be reduced to improve the efficiency (see FIG. 13).

[Improvement in Line Transient Characteristic in Case of Sudden Input Change]

Figure 14:
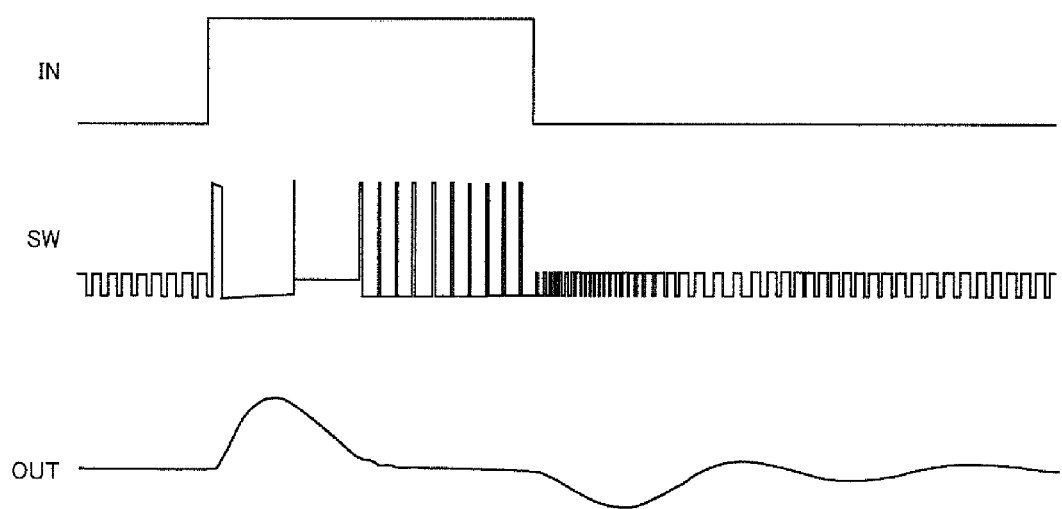
FIG. 14 is a timing chart for explaining a deterioration in line transient characteristic in a case of a sudden input change.
Figure 15:
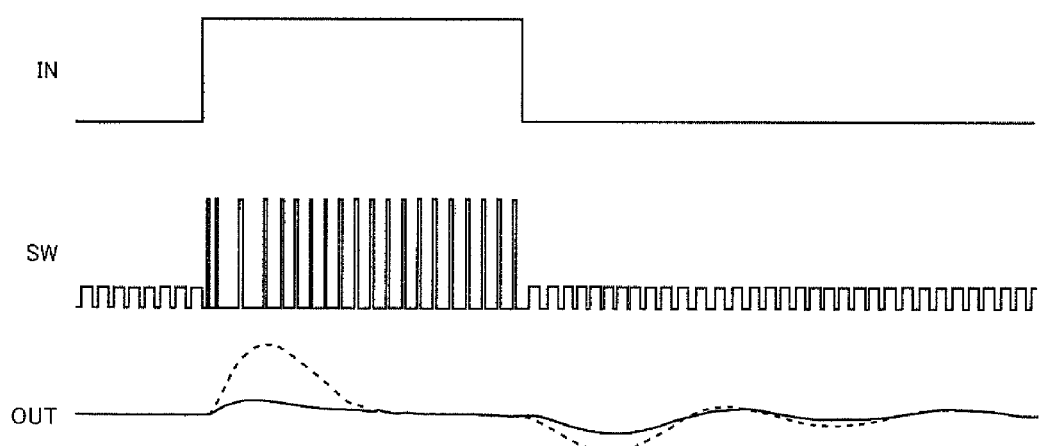
FIG. 15 is a timing chart for explaining an improvement in line transient characteristic in the case of a sudden input change.

Each of FIGS. 14 and 15 is a timing chart showing a line transient characteristic in a case of a sudden input change, in which, in order from the top, the input voltage IN, the switch voltage SW, and the output voltage OUT are depicted. FIG. 14 shows a state where the line transient characteristic is deteriorated when the on-time setting unit 15Y of the second configuration example is used, and FIG. 15 shows a state where the line transient characteristic is improved when the on-time setting unit 15Z of the third configuration example is used.

In the on-time setting unit 15Y of the second configuration example, while the first voltage VY1 is set to increase with a rate of increase (gradient) that is constant irrespective of the input voltage IN, the second voltage VY2 is set to vary with a variation in the input voltage IN (accordingly, a variation in duty of the switch voltage SW) so that the on-time Ton is thereby adjusted. The second voltage VY2, however, is generated via the filter Y7, and thus in the case of a sudden change in the input voltage IN, due to circuit delay of the filter Y7, the on-time Ton cannot be adjusted in a timely manner, which leads to an increase in amounts of overshoot and undershoot of the output voltage OUT, resulting in deteriorating the line transient characteristic (see FIG. 14).

On the other hand, in the on-time setting unit 15Z of the third configuration example, the first voltage VZ1 increases with a rate of increase (gradient) that varies with the input voltage IN. The first voltage VZ1 is directly inputted to the comparator Z4 without passing through the filter Z7, and this makes it possible, even in the case of a sudden change in the input voltage IN, to quickly adjust the on-time Ton and accordingly to improve the line transient characteristic (see FIG. 15).

<Application of the Present Invention to Television Set>

Figure 16:
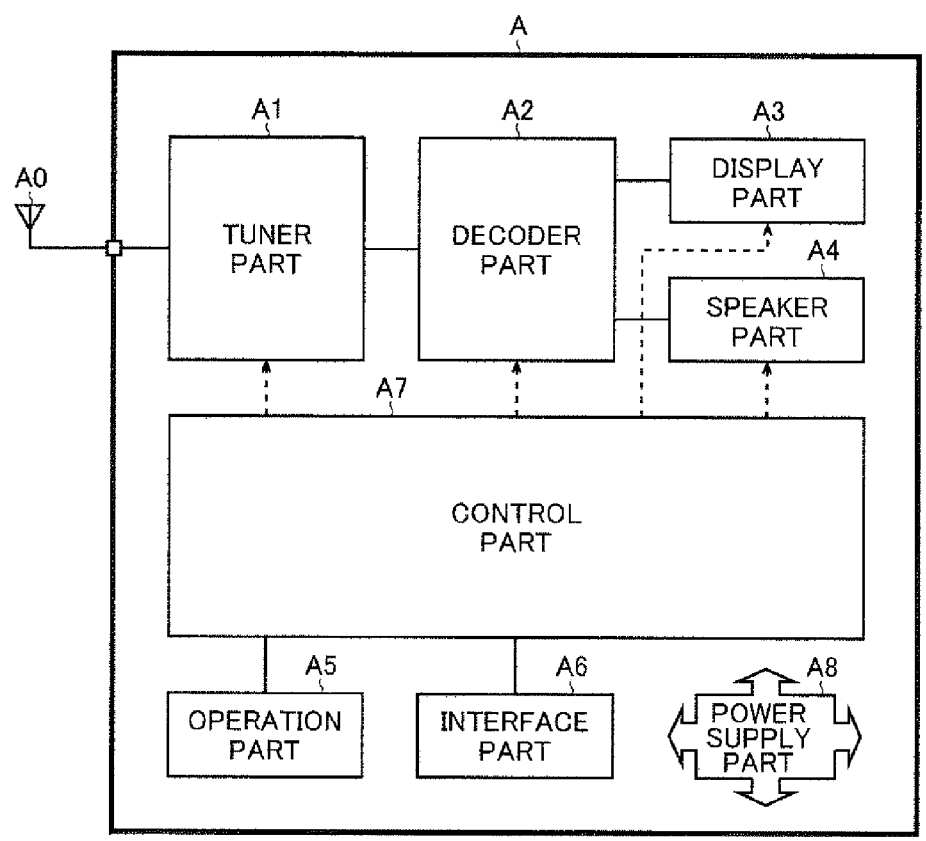
FIG. 16 is a block diagram showing a configuration example of a television set incorporating a switching power supply device.
Figure 17A:
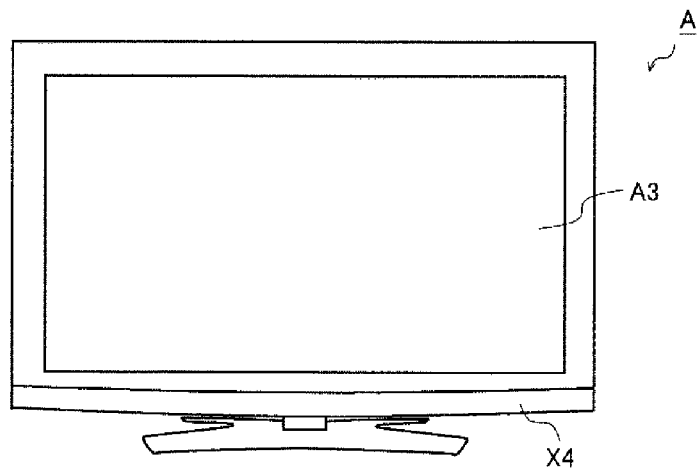
FIG. 17A is a front view of the television set incorporating the switching power supply device.
Figure 17B:
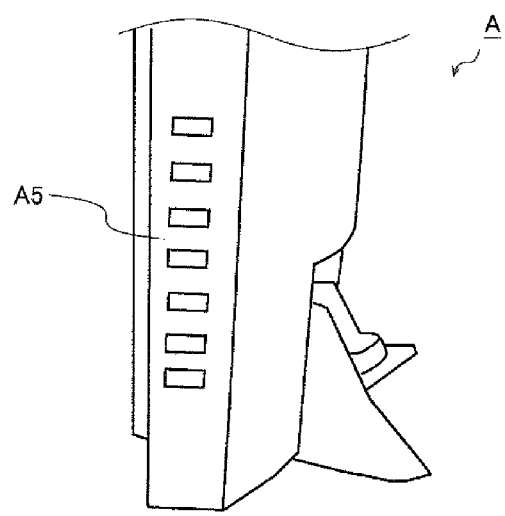
FIG. 17B is a side view of the television set incorporating the switching power supply device.
Figure 17C:
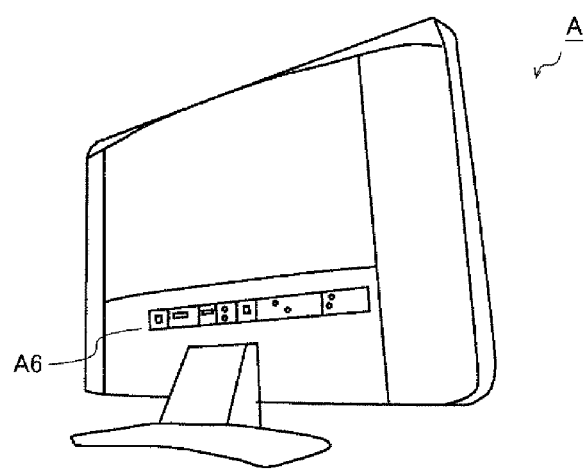
FIG. 17C is a rear view of the television set incorporating the switching power supply device.
Figure 18:
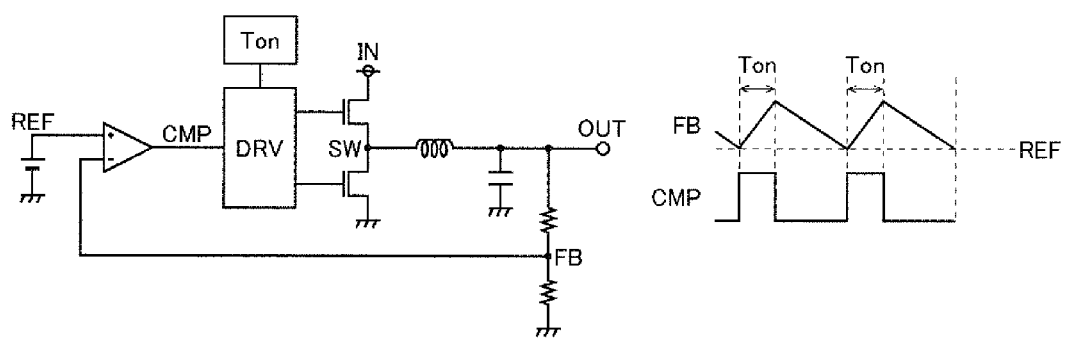
FIG. 18 is a diagram showing a conventional example of a switching power supply device.

FIG. 16 is a block diagram showing a configuration example of a television set incorporating the above-described switching power supply device. Furthermore, FIGS. 17A to 17C are a front view, a side view, and a rear view, respectively, showing the television set incorporating the above-described switching power supply device. A television set A of this configuration example has a tuner part A1, a decoder part A2, a display part A3, a speaker part A4, an operation part A5, an interface part A6, a control part A7, and a power supply part A8.

The tuner part A1 selects a broadcast signal of a desired channel from among reception signals received by an antenna A0 that is externally connected to the television set A.

The decoder part A2 generates a video signal and an audio signal from the broadcast signal selected by the tuner part A1. Furthermore, the decoder part A2 also has a function of, based on an external input signal sent from the interface part A6, generating a video signal and an audio signal.

The display part A3 outputs the video signal generated by the decoder part A2 in the form of video.

The speaker part A4 outputs the audio signal generated by the decoder part A2 in the form of audio.

The operation part A5 is one type of human interfaces that accept user operations. The operation part A5 can take the form of a button, a switch, a remote controller, or the like.

The interface part A6 is a front end that accepts an external input signal from an external device (an optical disk player, a hard disk drive, or the like).

The control part A7 performs centralized control of respective operations of the above-described parts A1 to A6. As the control part A7, a CPU (central processing unit) or the like can be used.

The power supply part A8 supplies the above-described parts A1 to A7 with power. As the power supply part A8, the foregoing switching power supply device 1 can be suitably used.

<Other Modification Examples>

While the descriptions of the foregoing embodiments exemplarily use a configuration in which the present invention is applied to a synchronous rectification type voltage step-down switching power supply device, there is no limitation thereto, and the present invention may be applied to a case where switching is driven by non-synchronous rectification and to a case where the switching power supply device has a voltage step-up or voltage step-up/-down type output stage.

As discussed above, the present invention is not limited in configuration to the foregoing embodiments, and various modifications can be made thereto within the spirit of the invention. That is, the foregoing embodiments are to be construed in all respects as illustrative and not limiting. It is to be understood that the technical scope of the present invention is indicated by the appended claims rather than by the above descriptions of the embodiments, and all changes that come within the meaning and range of equivalency of the claims are intended to be embraced therein.

INDUSTRIAL APPLICABILITY

The switching power supply device according to the present invention can be used as a power supply that is incorporated in various types of electronic apparatuses such as a liquid crystal display, a plasma display, a BD recorder/player, and a set-top box.

LIST OF REFERENCE NUMERALS 1 switching power supply device
10 semiconductor device (switching power supply IC)

11 N-channel type MOS field-effect transistor (output transistor)
12 N-channel type MOS field-effect transistor (synchronous rectification transistor)
13 driver
14 SR flip-flop
15 (15X, 15Y, 15Z) on-time setting unit
16 comparator
17 reference voltage generation unit
18 ripple injection unit
19 backflow current detection unit
L1 inductor
R1, R2 resistor
C1 capacitor
T1 to T3 external terminal
X1, Z1 voltage/current conversion portion
Y1 constant current source
X2, Y2, Z2 capacitor
X3, Y3, Z3 N-channel type MOS field-effect transistor
X4, Y4, Z4 comparator
X5, X6 resistor
Y5, Z5 level shifter
Y6 buffer
Y7, Z7 filter (CR filter)
Z8 selector
Z11 to Z13 resistor
Z14 operational amplifier
Z15 N-channel type MOS field-effect transistor
Z16, Z17 P-channel type MOS field-effect transistor
Z71 to Z73 resistor
Z74, Z75 capacitor
Z81, Z82 switch
A television set
A0 antenna
A1 tuner part
A2 decoder part
A3 display part
A4 speaker part
A5 operation part
A6 interface part
A7 control part
A8 power supply part

What is claimed is:

1. A switching power supply device, comprising:
a non-linear control type switching control unit that, in accordance with a result of a comparison between a feedback voltage and a reference voltage, performs on/off control of a switch element, and thereby generates an output voltage from an input voltage;
a backflow current detection unit that, upon detecting a backflow current flowing to the switch element, forcibly switches off the switch element; and
an on-time setting unit that sets an on-time of the switch element, in a case of the backflow current not being detected, in accordance with a duty of the switch element, and in a case of the backflow current being detected, in accordance with a switch voltage appearing at one end of the switch element or the output voltage, wherein
the on-time setting unit comprises:
a first voltage generation circuit that generates a first voltage in accordance with a charge/discharge operation of a capacitor;
a second voltage generation circuit that, in a case of the backflow current not being detected, generates a second voltage in accordance with a duty of the switch element, and in a case of the backflow current being detected, generates a second voltage in accordance with the switch voltage or the output voltage; and
a first comparator that compares the first voltage with the second voltage, and based on a result of the comparison, generates a first control signal, wherein
the first voltage generation circuit comprises:
a voltage/current conversion portion that generates a charge current in accordance with the input voltage;
the capacitor that is connected to the voltage/current conversion portion; and
a charge/discharge switch for switching between charging and discharging of the capacitor in accordance with on/off control of the switch element, wherein
the second voltage generation circuit comprises:
a level shifter that is supplied with the input voltage and performs level shifting with respect to a switch control signal for switching on/off the switch element or a switch voltage appearing at one end of the switch element;
a selector that, in a case of the backflow current not being detected, selectively outputs the switch control signal or the switch voltage after having been subjected to the level shifting, and in a case of the backflow current being detected, selectively outputs the switch voltage or the output voltage; and
a filter that generates the second voltage by smoothing an output from the selector.

2. The switching power supply device according to claim 1, wherein the filter comprises a CR filter circuit that is composed a resistor and a capacitor.

3. The switching power supply device according to claim 2, wherein
the filter comprises a second resistor that, together with a first resistor as a constituent component of the CR filter circuit, constitutes a voltage division circuit, and
a connection node between the first resistor and the second resistor is used as an input terminal or an output terminal of the filter.

4. A television set, comprising:
a tuner part that selects a broadcast signal of a desired channel from among reception signals;
a decoder part that generates a video signal and an audio signal from the broadcast signal selected by the tuner part;
a display part that outputs the video signal in a form of video;
a speaker part that outputs the audio signal in a form of audio;
an operation part that accepts user operations;
an interface part that accepts an external input signal;
a control part that performs centralized control of respective operations of the parts described above; and
a power supply part that supplies the parts described above with power,
wherein
the power supply part comprises the switching power supply device according to claim 1.

5. A switching power supply device, comprising:
a non-linear control type switching control unit that, in accordance with a result of a comparison between a feedback voltage and a reference voltage, performs on/off control of a switch element, and thereby generates an output voltage from an input voltage;
a backflow current detection unit that, upon detecting a backflow current flowing to the switch element, forcibly switches off the switch element; and an on-time setting unit that sets an on-time of the switch element, in a case of the backflow current not being detected, in accordance with a duty of the switch element, and in a case of the backflow current being detected, in accordance with a switch voltage appearing at one end of the switch element or the output voltage, wherein the on-time setting unit comprises:
- a first voltage generation circuit that generates a first voltage in accordance with a charge/discharge operation of a capacitor;
- a second voltage generation circuit that, in a case of the backflow current not being detected, generates a second voltage in accordance with a duty of the switch element, and in a case of the backflow current being detected, generates a second voltage in accordance with the switch voltage or the output voltage; and
- a first comparator that compares the first voltage with the second voltage, and based on a result of the comparison, generates a first control signal, wherein the switching control unit comprises:
- a feedback voltage generation unit that generates the feedback voltage by dividing the output voltage;
- a reference voltage generation unit that generates the reference voltage;
- a second comparator that compares the feedback voltage with the reference voltage, and based on a result of the comparison, generates a second control signal;
- a flip-flop whose output signal has a logic level that changes in accordance with the first control signal and the second control signal;
- a driver that, in accordance with the output signal of the flip-flop, performs on/off control of the switch element; and
- a ripple injection unit that injects a ripple component into the reference voltage.

6. A television set, comprising:
- a tuner part that selects a broadcast signal of a desired channel from among reception signals;
- a decoder part that generates a video signal and an audio signal from the broadcast signal selected by the tuner part;
- a display part that outputs the video signal in a form of video;
- a speaker part that outputs the audio signal in a form of audio;
- an operation part that accepts user operations;
- an interface part that accepts an external input signal;
- a control part that performs centralized control of respective operations of the parts described above; and
- a power supply part that supplies the parts described above with power, wherein the power supply part comprises the switching power supply device according to claim 5.

* * * * *